H. H. BOCHMANN.
DRIVING MECHANISM.
APPLICATION FILED FEB. 7, 1912.
1,060,528.
Patented Apr. 29, 1913.
3 SHEETS—SHEET 3.
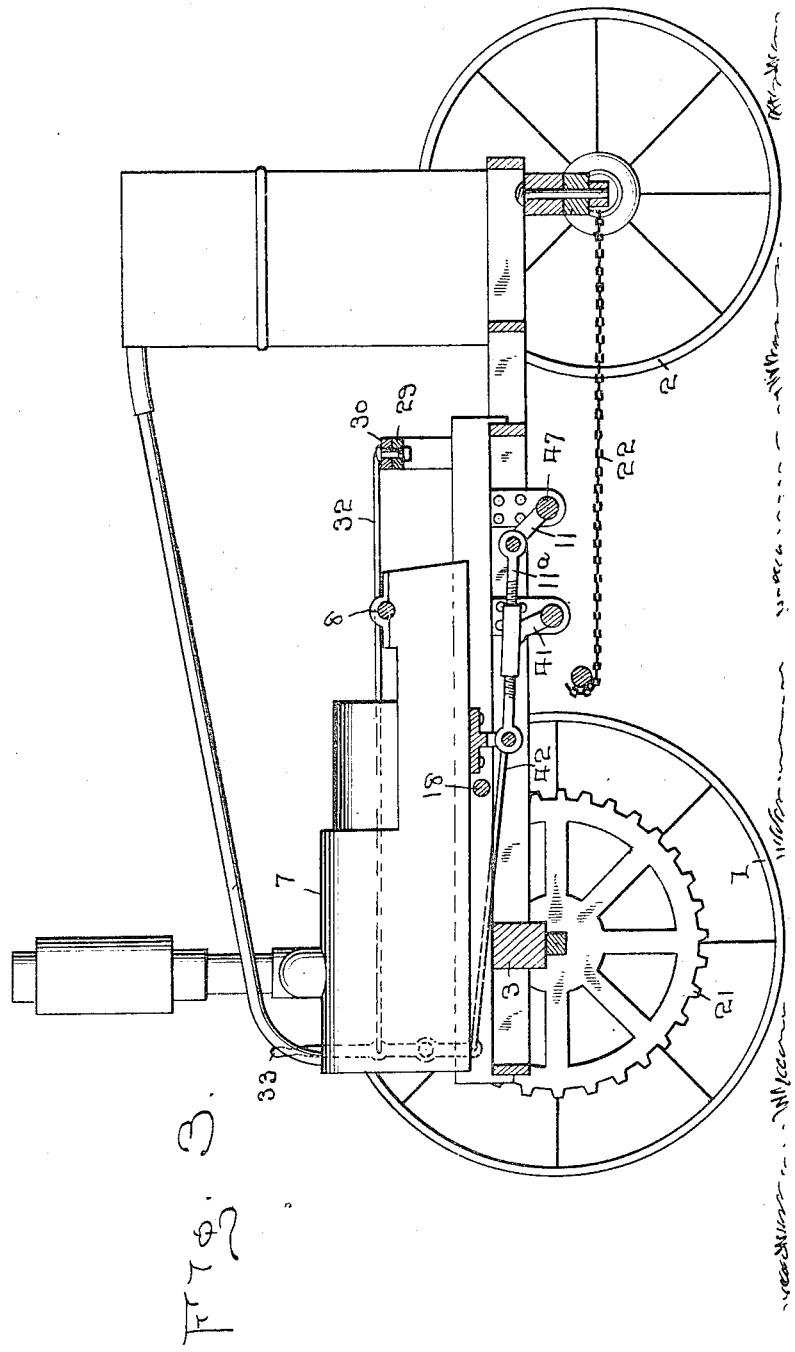
Witnesses
Thos. W. Riley
Sterling P. Buck.
Inventor
H. H. Bochmann
By W. T. FitzGerald
Attorney

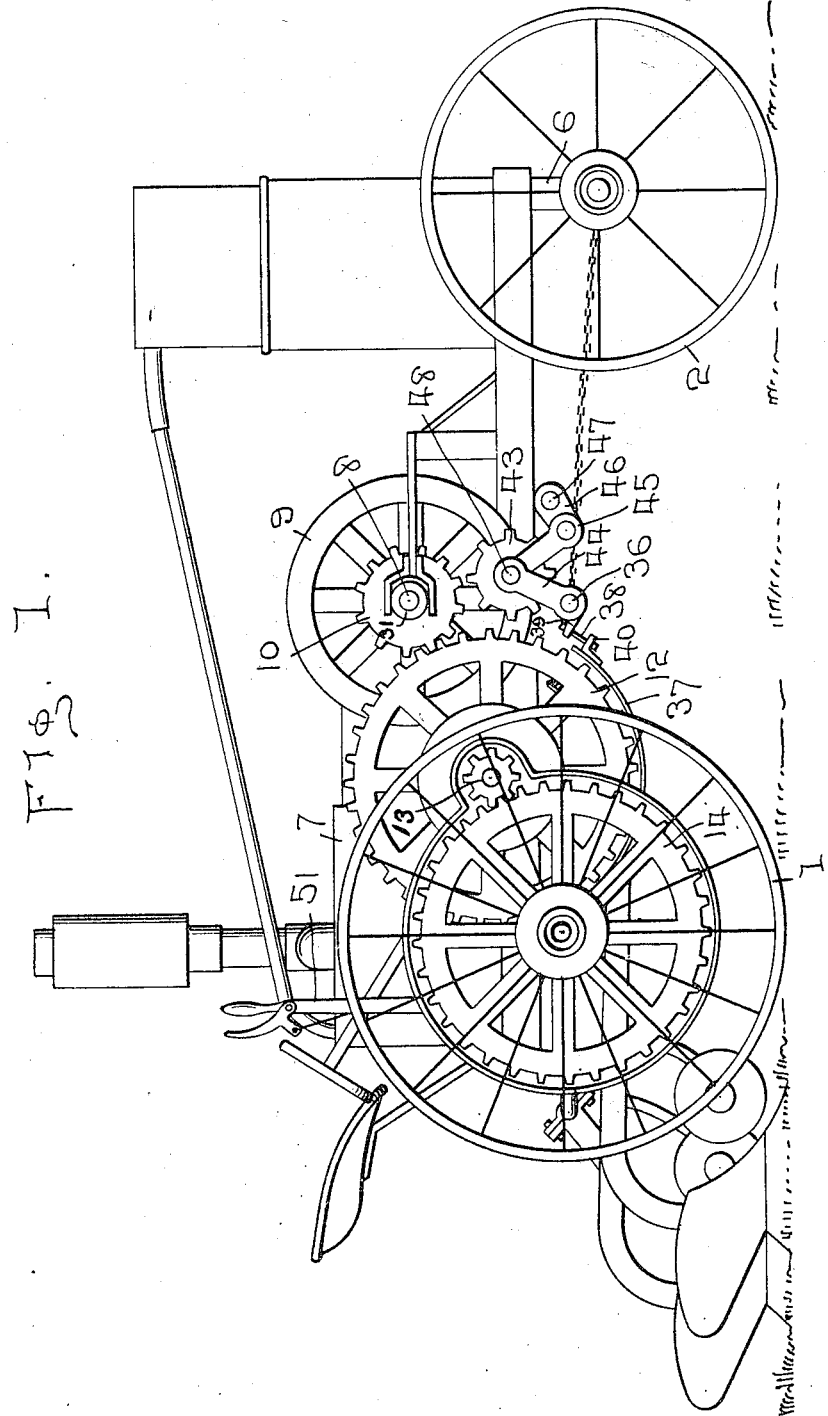

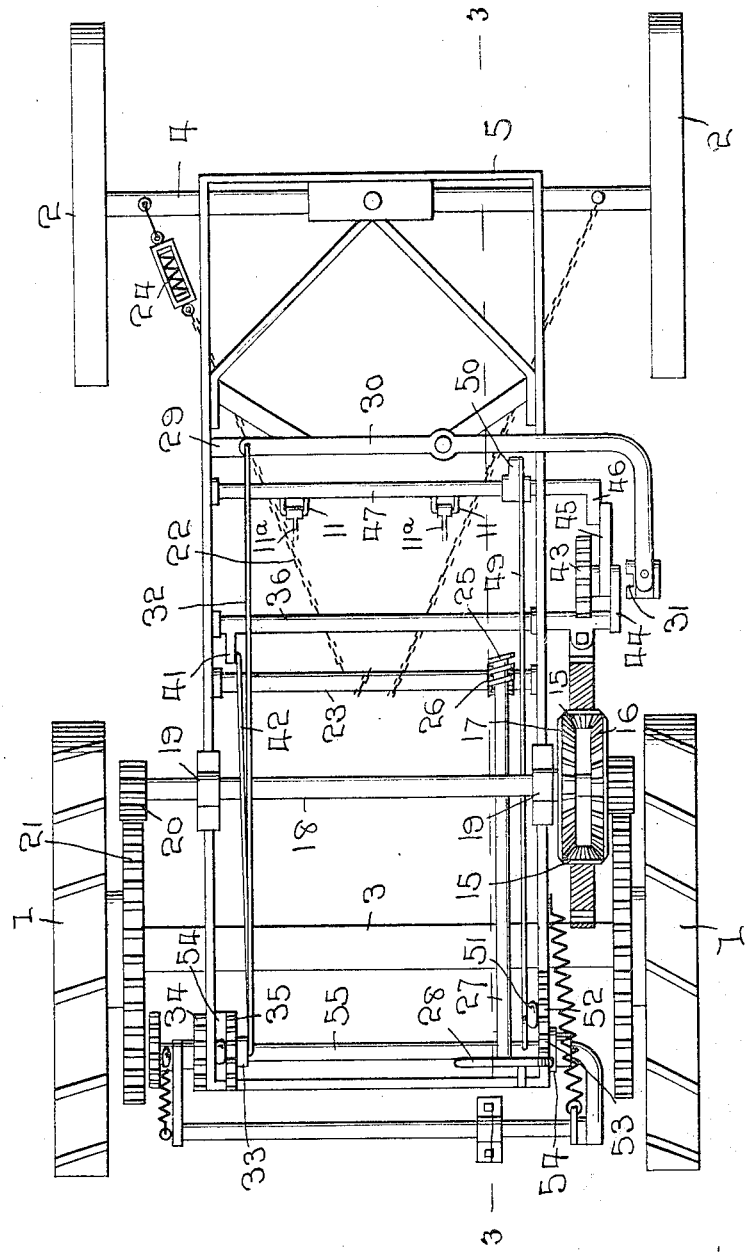

UNITED STATES PATENT OFFICE.

HERMANN H. BOCHMANN, OF HOLSTEIN, IOWA.

DRIVING MECHANISM.

1,060,528.

Specification of Letters Patent.   Patented Apr. 29, 1913.

Original application filed January 17, 1911, Serial No. 603,119. Divided and this application filed February 7, 1912. Serial No. 676,082.

*To all whom it may concern:*

Be it known that I, HERMANN H. BOCHMANN, a citizen of the United States, residing at Holstein, in the county of Ida and State of Iowa, have invented certain new and useful Improvements in Driving Mechanism; and I do hereby declare the following to be a full, clear, and exact description of the invention, such as will enable others skilled in the art to which it appertains to make and use the same.

My invention relates to driving mechanism, and it more particularly relates to an improved reversing gear mechanism.

An object of the invention is to provide improved means for reversing the direction of travel of the driven mechanism without reversing or stopping the engine or motor; and, while useful for a great variety of purposes, it will be especially desirable and valuable for the use of the farmer in the various farming operations, such as plowing the soil and subsequently harrowing or preparing it as a seed bed and in planting and harvesting the crops, for threshing, shelling, shredding, grinding, hauling farm produce and other capacities where motive power is used in the form of traction engines, and the subject matter of this application was originally a part of my application on engines, Serial No. 603,119, filed Jan. 17, 1911, and is a division thereof.

Another object, therefore, is to provide a motive power or traction engine which will supply power for general purposes of farm work, inasmuch as one or more breaking plows or the like may be attached to my traction engine and placed under the absolute control of the operator, enabling him to readily turn the machine in a limited space, whereby the land may be broken or plowed close up to the fence line, and after the operation of plowing, the subsequent operations of harrowing the land and planting it may readily be performed by connecting to my traction engine the respective implements necessary for the work and for all other purposes, as above stated.

In some instances it will be found desirable to connect in any suitable manner the plows, harrows and planting machines to the engine so that the three operations of plowing, harrowing and planting may be simultaneously performed by my traction engine, this application, however, relating to the tractor.

Other objects and advantages will be hereinafter clearly made apparent by reference to the accompanying drawings which are made a part of this application and in which, Figure 1 shows a side elevation of improved driving mechanism or tractor complete, showing gang plows operatively connected thereto, while, Fig. 2 is a top plan view of the tractor, and Fig. 3 is a vertical sectional view taken on the line 3—3 of Fig. 2.

Referring to the various details of my invention and coöperating accessories by their respective designating numerals, 1 indicates a pair of carrying wheels or traction wheels proper, while 2 indicates the forward or guiding wheels placed under absolute control of the operator, whereby my tractor may be readily guided as desired.

Resting upon the axles 3 and 4 upon which the traction wheels 1 and 2, respectively, are mounted is a frame 5, the forward end of the frame being mounted upon a suitable turntable 6, so that the front axle may be shifted back and forth to guide the vehicle.

Mounted upon the frame 5 in any suitable manner, is a motor 7 of the usual explosive type and having a driving shaft 8 coöperating therewith. Mounted upon the shaft 8 are the usual form of fly wheels 9, which add momentum to the shaft when the engine is started. The shaft 8 has mounted thereon a transmission gear 10, which meshes with an intermediary gear 12 when the engine is being driven forwardly, which gear coöperates with a pinion 13 and this pinion engages a transmission gear 14, carried by one of the driving wheels 1.

The intermediary gear 12 is provided with a differential feature by forming an opening through the hub of the intermediary gear and placing therein bevel pinions 15, which mesh with a bevel gear 16, carried by the pinion 13 and a similar bevel gear 17 on the opposite side of the intermediary gear, one of said bevel gears being loosely mounted upon the shaft 18, while the other is fixed thereto. The shaft 18 extends across the frame 5 and through bearings 19 thereon.

The opposite end of the shaft 18 from that occupied by the bevel gears and the pinion 13, is provided with a pinion 20, with which meshes a driving gear 21, carried by the other driving wheel 1 and by which means power may be applied from the engine to either or both of the gear wheels, even though one of the wheels be traveling at a greater speed than the other.

The forward axle 4 is guided through the medium of chains 22 which are wound around a drum 23, one of the chains having a spring link 24 in its length, which spring serves to hold the wheel traveling in the furrow in perfect alinement.

The drum 23 is rotated through the medium of a worm 25 and a gear 26 meshing therewith, the gear being attached to the drum, while the worm is attached to a shaft 27, the upper end of which is provided with the usual or any preferred form of hand wheel 28, by which the shaft 27 is operated to guide the engine.

Mounted upon the frame 5 is a bracket 29, upon which is pivotally mounted an L-shaped shifter lever 30, one end of the lever extending into alinement with the shaft 8 and coöperating with a clutch 31, while the opposite end of said lever has attached thereto a rod 32, which extends from the lever to a lever 33.

The lever 33 is provided with the usual or any preferred form of latch 34, which coöperates with a rack 35 carried by the frame 5 and by swinging said lever forwardly and rearwardly the clutch will be moved into or out of engagement with the clutch face (not shown) carried by the driver gear 10 for operatively connecting the motor with or disengaging it from the engine transmission gears.

Mounted below and extending transversely of the frame 5 is a shaft 36, to which is attached one end of a brake strap 37, the opposite end of said brake strap being attached to any suitable portion of the frame 5, that end of the strap attached to the shaft 36 having an adjusting bolt 38 which projects through an arm 39 carried by the shaft 36 and through an ear 40 at the end of the brake strap so that said strap may be readily adjusted to engage the periphery of the gear 12, below which the strap extends. The armed shaft 36 is also provided with a crank arm 41 at its opposite end, with which coöperates a rod 42, the opposite end of the rod being attached to the lever 33, so that when the lever is moved to disengage the clutch 31, the brake will be simultaneously set to stop the traction gears.

When it is desired to move the engine rearwardly or reverse the trend of the same, a reversing gear 43 is provided, which is adapted to mesh with the gear 10 and the intermediary gear 12, the gear 10 being moved away from the gear 12 before the gear 43 is moved into engagement therewith. The gear 43 is supported by means of links 44 and 45, the lower end of the link 44 being pivotally mounted upon the armed shaft 36 and the lower end of the link 45 being pivoted to a crank arm 46 carried by a shifter shaft 47, which shifter shaft is rotatably mounted below and transversely of the frame 5.

The motor 7 is moved bodily forward to disengage the gear 10 from the gear 12 by providing cranks 11 in the length of the shifter shaft 47, to which are attached rods or links 11$^a$, the opposite ends of which are connected in any suitable manner to the base of the motor and the cranks are so arranged that when the shaft 47 is rotated to move the gear 43 into engagement with the gears 10 and 12, the motor will be simultaneously moved forward, for disengaging the teeth of the gears 10 and 12 from each other.

The upper ends of the links 44 and 45 are brought together and engage the axle 48 of the gear 43, and, as the crank arm 46 moves in the arc of a circle when the shaft 47 is rotated, the auxiliary gear will be moved upwardly and rearwardly until it is in engagement with the gears 10 and 12, thereby reversing the movement of the gear 12 and the parts operated thereby.

The shaft 47 is operated to move the gear 43 upwardly and the motor forwardly through the medium of a rod 49, one end of which is attached to crank arm 50 on the shaft 47 and the opposite end to a lever 51, said lever having a latch 52 coöperating with a rack 53 for holding the gear 43 in its adjusted position. The lever 33 is preferably carried upon a shaft 55 mounted in bearings 54 extending downwardly from the main frame 5, as will be readily understood.

Plows or other implements may be readily connected to the framework or directly to the tractor, for performing the various farming operations. It will thus be seen that although the form of motor traction engine herein shown is much lighter in weight than the other so-called traction engines, yet a greater power can be obtained therefrom in view of the manner in which the motor is geared to the traction wheels.

What I claim is:

1. In a driving mechanism, a frame, an engine including a gear wheel and being movably mounted upon the frame, a power transmission shaft journaled on the frame, a differential gear mechanism including a spur gear mounted on the transmission shaft, a shifter shaft having cranks and a crank arm thereon, links connecting the cranks with the engine, links pivotally connecting with the shifter shaft and with the crank arm, a spur gear carried by the last said links, a second crank arm on the shifter shaft, and an operating lever connected with the last said crank arm for partially rotating the shifter shaft and thereby simultaneously moving the engine on the frame and moving the last said spur gear into mesh with the second said spur gear and with the first said spur gear while moving the latter out of mesh with the second said spur gear.

2. In a driving mechanism, a frame, an engine including a shaft and a gear wheel carried thereby, said engine being movably mounted upon the frame, a power transmission shaft mounted for rotation relatively to the frame, a spur gear wheel mounted to rotate with the shaft, an armed shaft journaled to the frame and carrying an actuating arm and a brake-arm, an actuating lever, means connecting the actuating lever with the actuating arm, a brake member connected to the brake-arm, said brake member being in position for alternate engagement and disengagement with the second said gear wheel, a third gear wheel, a shifter lever, a clutch carried by the shifter lever in operative relation to the first said shaft for moving said shaft and the gear wheel carried thereby, and means connecting said shifter lever with said actuating lever, whereby the brake member and clutch member may be actuated simultaneously.

3. In a driving mechanism, a frame, an engine including a shaft and a gear wheel carried thereby, said engine being movably mounted upon the frame, a power transmission shaft mounted to rotate relatively to the frame, a spur gear wheel carried by the shaft and adapted to mesh with the first said gear wheel, a shifter shaft, means connected with the shifter shaft and with the engine for moving the latter, an arm carried by the shifter shaft, an actuating lever operatively connected with said arm for partially rotating the shifter shaft, and a third gear wheel operatively connected with the shifter shaft for being moved into mesh with the first said gear wheel and the second said gear wheel when said shaft is rotated and said engine is moved for moving the first said gear wheel and second said gear wheel out of mesh.

4. In a driving mechanism, a frame, an engine including a gear wheel and being movably mounted upon the frame, a driven mechanism associated with the frame and having a gear wheel adapted to mesh with the gear wheel of the engine, a reversing gear wheel, and means for simultaneously moving the engine on the frame and moving the last said gear wheel into mesh with the first said gear wheel and the second said gear wheel.

5. In a driving mechanism, a driven gear, an engine including a driving gear adapted to mesh with the driven gear, an idler gear adapted to mesh with the driving gear and the driven gear when said driving gear and driven gear are not in mesh with each other, a brake element, and means for simultaneously moving the driving gear and driven gear into mesh and moving the idler gear out of mesh therewith and applying the brake element to the driven gear.

In testimony whereof I have signed my name to this specification in the presence of two subscribing witnesses.

HERMANN H. BOCHMANN.

Witnesses:
GLEN M. GRACEY,
A. X. BERTELSEN.